United States Patent Office 3,787,507
Patented Jan. 22, 1974

---

3,787,507
HALOGENATED BENZYLPHENOLS HAVING BACTERIOSTATIC ACTIVITY
Jacques Debat, Paris, France, assignor to Institut de Recherches Chimiques et Biologiques Appliquees (I.R.C.E.B.A.), Paris, France
No Drawing. Filed Feb. 5, 1971, Ser. No. 113,057
Claims priority, application France, Feb. 13, 1970, 7005194
Int. Cl. C07c *39/12, 39/24*
U.S. Cl. 260—619 A     6 Claims

---

ABSTRACT OF THE DISCLOSURE

Halogenated benzylphenols of the formula:

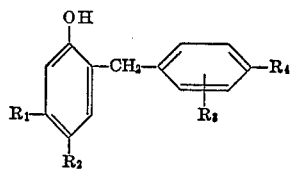

in which $R_1$ is a hydrogen atom when $R_2$ is a bromine or fluorine atom, or $R_1$ is a trifluoromethyl group when $R_2$ is a hydrogen atom; $R_3$ is a hydrogen or chlorine atom in the 2'-position or 3'-position and $R_4$ is a chlorine or fluorine atom having bacteriostatic properties. Also disclosed are their use in the treatment of angina and bronchopulmonary and stomatological disorders and a process of preparation of these compounds by the Friedel-Crafts type reaction between the corresponding phenol and substituted benzyl chloride.

---

The present invention relates to new halogenated benzylphenols corresponding to the following general formula:

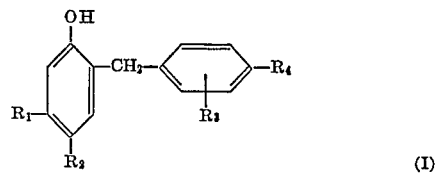

in which $R_1$ is a hydrogen atom when $R_2$ is a bromine or fluorine atom or $R_1$ is a trifluoromethyl group when $R_2$ is a hydrogen atom; $R_3$ is a hydrogen or chlorine atom in the 2'- or 3'-position; and $R_4$ is a chlorine or fluorine atom.

Various benzylphenols having halogen or trifluoromethyl substituents on the phenol nucleus have already been prepared and their bacteriostatic activity has been studied. However, it has now been found that benzylphenols which are similarly substituted by one or more halogen atoms on the benzyl nucleus have a clearly greater bacteriostatic activity than the former compounds.

The compounds of Formula I can be prepared according to the invention by a synthesis process of the Friedel-Craft type, which comprises reacting a phenol of the formula:

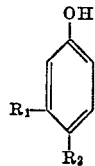

in which $R_1$ and $R_2$ are as defined above, with a substituted benzyl chloride of the formula:

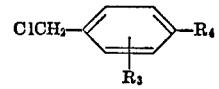

in which $R_3$ and $R_4$ are as defined above, in the presence of zinc chloride as a catalyst, preferably in a solvent such as chloroform and at the reflux temperature of the solvent. A stoichiometric excess of the phenol in relation to the benzyl chloride is used, so as to avoid the formation of the dibenzyl derivative of the pehnol substituted in the 2,6-positions.

The general method of operation is as follows:
Quantities proportional to a mole of the phenol and 0.75 mole of the substituted benzyl chloride are dissolved in 800 ml. of anhydrous chloroform. 0.06 mole of crushed cast zinc chloride are added and the mixture is gently refluxed for 15 to 24 hours. After cooling, the reaction mixture is admixed with 800 ml. of water, stirred and decanted. The organic phase is washed in water until it has pH 7 and then dried over sodium sulphate. The solvent is evaporated off and the residue subjected to distillation under reduced pressure.

By using this method of operation, the following compounds are prepared, which are given by way of non-limitative examples:

EXAMPLE 1

2-(2',4'-dichlorobenzyl)-4-fluorophenol 57 g. of p-fluorophenol and 73 g. of 2,4-dichlorobenzyl chloride were dissolved in 400 ml. of dry chloroform. 8 g. of crushed cast zinc chloride were added and the mixture was refluxed for 18 hours. After cooling, the reaction mixture was admixed with 400 ml. of water, stirred and decanted. The organic phase was drawn off and twice washed with 400 ml. of water which enabled a pH of 6.8 to be obtained; it was then dried over 50 g. of sodium sulphate and then dessicated. The solvent was recovered by filtration, then evaporated and the residue was subjected to distillation under reduced pressure.

A first fraction passing over from 80° to 1180° C. under a pressure of 0.5 mm. of mercury was composed of unreacted starting material.

The product sought passed over above 180° C. The operation was stopped when the temperature reached 210° C., leaving in the base of the still a quantity of the dibenzyl substituted product, the formation of which is inevitable.

57 g. of the desired product was obtained, namely 2-(2',4' - dichlorobenzyl) - 4 - fluorophenol, which corresponded to a yield of 42%.

The product obtained remained liquid and then readily crystallized in needles.

Supplementary purification could be obtained by recrystallization from petroleum ether.

The product obtained melted at 75° C. (Maquenne block).

EXAMPLES 2 TO 10

By adopting the same method of operation as for Example 1, the following compounds according to the invention were likewise prepared, for which are given the chemical name, quantitative formula, molecular weight and the following physical constants: melting point (M.P.) measured on a Maquenne block, boiling point (B.P.) under vacuum and refractive index, $\eta$.

EXAMPLE 2

2-(4'-fluorobenzyl)-4-fluorophenol $C_{13}H_{10}F_2O = 220$
B.P.$_{1.5}$ = 130°–140° C.
$\eta_{23°\,C.}$ = 1.5565

EXAMPLE 3

2-(4'-chlorobenzyl)-4-fluorophenol $C_{13}H_{10}ClFO = 236.5$
M.P. = 41° C.

EXAMPLE 4

2-(3',4'-dichlorobenzyl)-4-fluorophenol $C_{13}H_9Cl_2FO = 271$
M.P. = 75° C.

EXAMPLE 5

2-(4'-fluorobenzyl)-4-bromophenol $C_{13}H_{10}BrFO = 281$
M.P. = 67° C.

EXAMPLE 6

2-(4'-chlorobenzyl)-4-bromophenol $C_{13}H_{10}BrClO = 297.5$
M.P. = 52° C.

EXAMPLE 7

2-(2',4'-dichlorobenzyl)-4-bromophenol $C_{13}H_9BrCl_2O = 332$
M.P. = 59° C.

EXAMPLE 8

2-(3',4'-dichlorobenzyl)-4-bromophenol $C_{13}H_9BrCl_2O = 332$
M.P. = 63° C.

EXAMPLE 9

2-(2',4'-dichlorobenzyl)-5-trifluoromethylphenol $C_{14}H_9Cl_2F_3O = 321$
M.P. = 80° C.

EXAMPLE 10

2-(3',4'-dichlorobenzyl)-5-trifluoromethylphenol $C_{14}H_9Cl_2F_3O = 321$
B.P.$_{0.4}$ = 135° C.
$\eta_{23.5°\,C.}$ = 1.5438

The bacteriostatic activity in vitro of the compounds of the invention was determined, by comparing it with that of two control compounds which did not have any halogen substitution on the nucleus of the benzyl group, i.e. for the p-fluoro derivatives of phenol according to the invention with that of 2-benzyl-4-fluorophenol, and for the p-bromo derivatives with that of 2-benzyl-4-bromophenol.

For each compound, the activity in relation to the Gram+ strain of London staphylococcus, taken as the reference strain and the activity in relation to the Gram− strain of *Escherichia coli* were studied.

The experiment was carried out in a culture medium of the following formula:

Indole-free bacteriological peptone __Percent by wt.__ 40
Sodium chloride _____do____ 5
Glucose _____do____ 2
pH _____ 7–7.2

The method used involved successive dilutions of the relevant compound. A first experiment was carried out with a concentration of 1‰. Then successive experiments were made with dilutions increasing in thousandths to 1/10,000, then in ten-thousandths from 1/10,000 to 1/100,000 and then in hundred-thousandths from 1/100,000 to 1/1,000,000. If the product was found to be active at 1/1,000,000, a new series of experiments was made with the dilutions increasing in millionths.

Two series of experiments were made independently with the same respective dilutions, and the results of the two series had to be identical.

The cultures were examined after 24 hours in order to evaluate the activity of the compound tested.

The results are given in Table I which shows the minimum active concentrations, in relation to Gram+bacteria and Gram−bacteria, the various compounds according to the invention and the two compounds which are non-halogenated on the nucleus of the benzyl group used for comparison, namely 2-benzyl-4-fluorophenol (control A) and 2-benzyl-4-bromophenol (control B).

From the table, it can be seen that the compounds according to the invention have on the whole a higher activity in relation to the Gram+ bacteria than the similar compounds non-halogen substituted on the nucleus of the benzyl group. The more active compounds in relation to these bacteria are, firstly, compounds having 2 halogen substituents on the benzyl group (Examples 1, 4, 7 and 8) and, secondly, compounds having a trifluoromethyl substituent in the 5-position of the phenol nucleus (Examples 9 and 10). The more active compounds in relation to the Gram− bacteria are the 4-bromo compounds.

TABLE I

| Compound | $R_1$ | $R_2$ | $R_3$ | $R_4$ | Minimum active concentration Gram + | Minimum active concentration Gram − |
|---|---|---|---|---|---|---|
| Control A | H | F | H | H | 1/60,000 | 1/20,000 |
| Example: | | | | | | |
| 2 | H | F | H | F | 1/50,000 | 1/10,000 |
| 3 | H | F | H | Cl | 1/100,000 | 1/90,000 |
| 1 | H | F | 2'-Cl | Cl | 1/1,000,000 | 1/30,000 |
| 4 | H | F | 3'-Cl | Cl | 1/800,000 | 1/60,000 |
| Control B | H | Br | H | H | 1/100,000 | 1/100,00 |
| Example: | | | | | | |
| 5 | H | Br | H | F | 1/400,000 | 1/100,000 |
| 6 | H | Br | H | Cl | 1/600,000 | 1/30,000 |
| 7 | H | Br | 2'-Cl | Cl | 1/500,000 | |
| 8 | H | Br | 3'-Cl | Cl | 1/700,000 | |
| 9 | CF$_3$ | H | 2'-Cl | Cl | 1/1,000,000 | |
| 10 | CF$_3$ | H | 3'-Cl | Cl | 1/800,000 | |

The acute toxicity and chronic toxicity of the compounds according to the invention were studied.

The DL-50 was determined using groups of 10 Swiss mice weighing from 17 to 21 g. The product was administered per os in a suspension of olive oil. The concentration of the product was varied in this suspension so that the volume of liquid ingested was uniformly 0.4 ml. per 20 g. of weight.

The following table gives the mortality rate observed with increasing doses of the product of Example 3, 2-(4'-chlorobenzyl)-4-fluorophenol.

MORTALITY

| Dose in mg./kg. | The same day | 24 hrs. later | From 3d to 8th day | In percent |
|---|---|---|---|---|
| 500 | 0 | 0 | 0 | 0 |
| 1,000 | 0 | 3 | 0 | 30 |
| 1,500 | 0 | 8 | 0 | 80 |
| 2,000 | 1 | 8 | 0 | 90 |
| 2,500 | 0 | 10 | 0 | 100 |

The maximum dose tolerated for the product of Example 3 was therefore 500 mg./kg. and the DL-50 was 1,350±230 mg./kg.

In rats, the DL-50 determined under the same conditions was between 2000 and 2500 mg./kg. From 1500 mg./kg., irritation of the stomach lining was detected.

The DL-50 was determined in mice for all the compounds of Examples 1 to 10 administered orally; for all these compounds, the DL-50's were located between 1.3 and 2 g./kg.

In the course of tests of chronic toxicity over 3 months, carried out in rats which had been given oral doses of 50 and 200 mg./kg. of the compound of Example 3, there was no sign of toxicity, no action on the weight graph, no macroscopic or microscopic modification of the stomach, heart, lungs, kidneys, spleen and liver.

The product was found in the urine at a rate of about 40% of the ingested dose, whether free or conjugated, which showed that its absorption and passage in the general circulation are good.

The compounds according to the invention are, according to the first clinical experiments carried out, particularly active in cases of angina, pneumonopathy and bronchopathy, and in odonato-stomatological disorders. The effective therapeutic dose is in general 1 to 2 per day in an adult weighing 60 kg.

The active compound can be incorporated in a dosage unit of 200 to 500 mg. according to current pharmaceutical practice in a suitable pharmaceutical excipient and administered orally in the form of tablets or powder-filled or oil-filled capsules, this last form being particularly well suited to the compounds according to the invention. These compounds can likewise be administered rectally in the form of suppositories. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be an encapsulating material. In powders, the carrier is a finely-divided solid which is in admixture with the finely-divided compound. In tablets, the compound is mixed with carrier having the necessary binding properties in suitable proportions and compacted in the shape and size desired. The powders and tablets preferably contain from 1 to 95% by weight of the active ingredient. Suitable acid carriers include magnesium carbonate, magnesium, stearate, talc, sugar, lactose, pectin, dextrin, starch, gelatin, adraganth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions. Liquid preparations can also be formulated in solution in aqueous polyethylene glycol solutions or in oil. Aqueous suspensions suitable for oral use can be made by dispersing the finely-divided compound in water with viscous material, e.g. natural or synthetic gums or resins, for example, gum arabic, ion-exchange resins, methyl cellulose, sodium carboxymethyl cellulose and other well-known suspending agents.

Preferably, the pharmaceutical preparation is in unit dosage form. In such form, the preparation is sub-divided in unit doses containing appropriate quantities of the compound. The unit dosage form can be a packaged preparation, the package containing discrete quantities of preparation, for example, packeted powders of vials or ampoules.

The unit dosage form can be a capsule, cachet or tablet itself or it can be an appropriate number of any of these in packaged form. The quantity of compound in a unit dose of preparation may be varied or adjusted from 50 to 500 mg. according to the particular application and the potency of the active ingredient.

I claim:

1. A compound selected from the group consisting of (a) 2-(2',4'-dichlorobenzyl)-4-fluorophenol; (b) 2-(3',4'-dichlorobenzyl)-4-fluorophenol; (c) 2-(3',4'-dichlorobenzyl)-4-bromophenol; (d) 2-(2',4'-dichlorobenzyl)-5-trifluoromethylphenol and (e) 2-(3',4'-dichlorobenzyl)-5-trifluoromethylphenol.
2. 2-(2',4'-dichlorobenzyl)-4-fluorophenol.
3. 2-(3',4'-dichlorobenzyl)-4-fluorophenol.
4. 2-(3',4'-dichlorobenzyl)-4-bromophenol.
5. 2-(2',4'-dichlorobenzyl)-5-trifluoromethylphenol.
6. 2-(3',4'-dichlorobenzyl)-5-trifluoromethylphenol.

References Cited

UNITED STATES PATENTS

| | | | |
|---|---|---|---|
| 1,880,566 | 10/1932 | Weiler et al. | 260—619 R |
| 1,967,825 | 7/1934 | Klarmann et al. | 260—619 R X |

OTHER REFERENCES

Huston et al.: "J. Am. Chem. Soc." vol. 55, pp. 2146–49, 1933; ibid., pp. 4639–43.

Yale: "J. Med. & Pharm. Chem.," vol. 1, No. 2, p. 121, 1959.

HOWARD T. MARS, Primary Examiner

N. MORGENSTERN, Assistant Examiner

U.S. Cl. X.R.

260—999; 424—347